June 8, 1965   J. W. TRUMPY ETAL   3,188,645
STETHOSCOPIC SPECTROGRAPH
Filed Sept. 26, 1963   8 Sheets-Sheet 1

INVENTORS
JAY W. TRUMPY
HUBERT O. RITLAND
MELVIN D. OVITT

BY Dork N. Jen
AGENT

June 8, 1965   J. W. TRUMPY ETAL   3,188,645
STETHOSCOPIC SPECTROGRAPH
Filed Sept. 26, 1963   8 Sheets-Sheet 4

INVENTORS
JAY W. TRUMPY
HUBERT O. RITLAND
MELVIN D. OVITT
BY
AGENT

Fig. 11

June 8, 1965    J. W. TRUMPY ETAL    3,188,645
STETHOSCOPIC SPECTROGRAPH
Filed Sept. 26, 1963    8 Sheets-Sheet 8

INVENTORS
JAY W. TRUMPY
HUBERT O. RITLAND
MELVIN D. OVITT

BY
AGENT

United States Patent Office 3,188,645
Patented June 8, 1965

3,188,645
STETHOSCOPIC SPECTROGRAPH
Jay W. Trumpy, Pacific Palisades, and Hubert O. Ritland and Melvin O. Ovitt, Los Angeles, Calif., assignors to Douglas Aircraft Company, Inc., Santa Monica, Calif.
Filed Sept. 26, 1963, Ser. No. 311,691
19 Claims. (Cl. 346—33)

Our invention relates generally to means for analyzing and recording signals of a periodic nature. More particularly, the invention relates to an instrument useful in medical diagnosis of, for example, heart trouble, and which will record and identify the sounds made by the action of individual parts of the heart.

The stethoscope is a well-known instrument which can be used in the diagnosis of heart trouble. The heart sounds heard through the stethoscope must, of course, be properly analyzed or interpreted by a competent heart specialist in order to obtain any idea as to the possible or probable trouble in the heart. Such conclusions are based largely on the experience of the physician in relating certain sounds to known sounds which are characteristic of different types of heart trouble. For example, a defective mitral valve would normally produce certain characteristic sounds that might be recognized by a heart specialist. Admittedly, it is extremely difficult to obtain an accurate analysis and diagnosis with any reasonable certainty of the specific nature of any heart trouble solely by means of a stethoscope. One of the difficulties here resides in the fact that a written record of the sounds is not available for careful study from an instrument such as the ordinary stethoscope.

The well-known electrocardiograph does provide a written record or graph which is a timewise plot of the electrical potential of the impulse signal that triggers the heart for each heart beat. It does not, however, operate on the basis of heart sounds and does not provide as much useful information to a heart specialist as does the stethoscope. The electrocardiograph is, of course, extremely useful for diagnosis of certain aspects of heart trouble, but to the experienced heart specialist, the stethoscope is an indispensible instrument for obtaining fundamental and critically important information of the heart.

Bearing in mind the foregoing, it is a major object of our invention to provide a stethoscopic device which will produce a written record or graph based upon heart sounds and is particulraly useful for diagnosis of heart disorders.

Another object of the invention is to provide an instrument which will produce recordings of heart sounds wherein an accurate and comprehensive analysis can be made from such recordings to specifically determine various heart defects.

A further object of the invention is to provide a stethoscopic spectrograph which will produce recordings of heart sounds that are clearly illustrative of the specific nature and location of any defects of the heart.

A still further object of this invention is to provide a heart sound spectrograph which will produce recordings of a uniform size over a wide range of different repetition rates of heart beats.

Briefly, and in general terms, the foregoing and other objects are preferably accomplished by providing an instrument which includes a carriage that can be moved in a lateral direction above the surface of suitable recording paper, the carriage in turn mounting pen means which is longitudinally movable with respect to the surface of the paper, microphone means adapted to pick up periodic sounds such as those of heart beats and convert these sounds into an electrical signal, means for amplifying the electrical signal, means adjustably coupled with the carriage and responsive to lateral movement thereof for selectively obtaining successive frequency components of the amplified electrical signal and recording the frequency components on the paper by the pen means in its longitudinal movement in contact with the surface of the paper, filter means for obtaining a predominant, recurrent, synchronizing signal from the amplified electrical signal, and means for varying the speed of the pens according to the repetition rate of the predominant, synchronizing signal whereby recordings of uniform size having markings thereon indexed to similar reference points, are produced over a wide range of different rates of heart beats.

Structurally simplified versions of our invention have been provided by modifying certain parts thereof. In one version, a manually set stepper motor drive is utilized for driving the pens, and in another version, the carriage has been eliminated and only a single motor is used to drive both pens and paper.

Our invention will be more fully understood, and other objects and features will become apparent from the following detailed description of illustrative examples of the invention to be taken in connection with the attached drawings, in which:

FIGURE 3 is a schematic block diagram of the invention shown in FIGURE 1;

FIGURE 12 is a schematic block diagram of a modified form of the invention;

Figure 1:
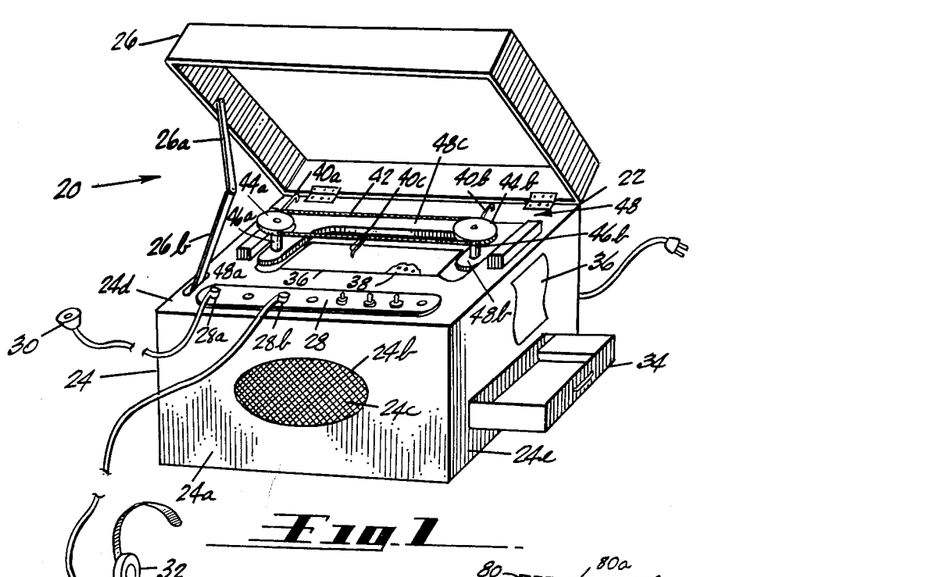
FIGURE 1 is a perspective view of an illustrative embodiment of our invention.

FIGURE 1 is a perspective view of an illustrative embodiment of our stethoscopic spectrograph. The spectrograph 20 includes a generally rectangular carrying case 22 having a normally lower body portion 24 and an upper hinged lid 26. The lid 26 may be held up by the pin-jointed brace arm 26a and 26b. The front panel 24a of the body portion 24 has an oval cutout 24b which is preferably covered with a suitable mesh grid 24c. A speaker (not visible) is mounted to the front panel 24a directly behind the cutout 24b.

A control panel 28 is located near the front of the top panel 24d of the body portion 24. The control panel 28 includes jacks 28a and 28b into which are plugged the lead ends of a stethoscopic microphone 30 and a headphone 32, respectively. The microphone 30 and headphone 32 may be stored in drawer 34 which is adapted to slide into and out of the side panel 24e. The drawer 34 can also be used to store graph paper. The paper 36 is suitably positioned on top of a somewhat raised, flat platen 38 and is electrically marked by pens 40 such as the three pens 40a, 40b and 40c.

The platen 38 may be hollow, having a large number of small apertures in its upper surface connecting with the hollow interior of the platen 38. The hollow interior of the platen 38 is connected to a suitable vacuum source to produce a relatively light vacuum through the platen apertures which causes the paper 36 to be held flat against the platen's surface. The markings on the surface of the paper 36 are not disrupted by the platen apertures because of their small size. A suitable vacuum can be produced by driving a small suction pump or motor (not shown) through an appropriate drive connection to the motor 68 (see FIGURE 2).

The three pens 40a, 40b and 40c are equidistantly mounted circumferentially on a closed band 42, and the band 42 is, in turn, mounted on pulleys 44a and 44b which are respectively affixed to the ends of two vertical and rotatable shafts 46a and 46b. The shafts 46a and 46b are rotatably mounted to the arms 48a and 48b, respectively, of plate structure 48c of the carriage 48. The carriage 48 is progressively moved from a front position rearwardly to a back position as the pens 40 are moved around their loop. Pulleys 44a and 44b are structurally designed with peripheral weight orientation to provide a certain amount of flywheel effect.

Figure 2:
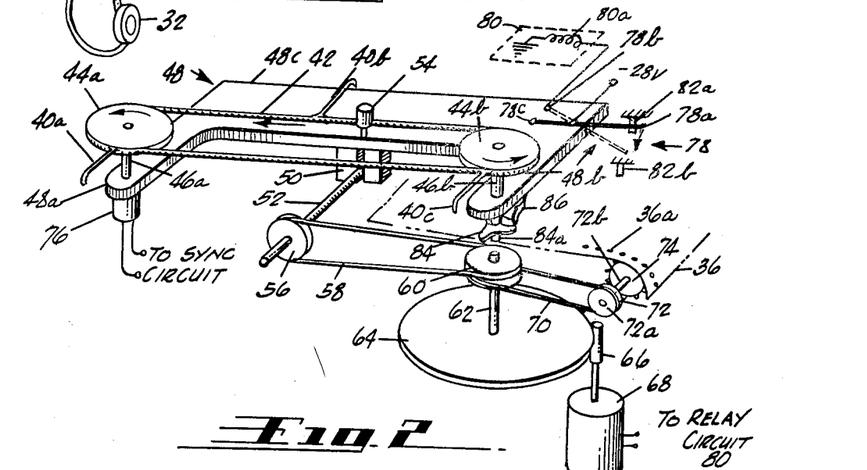
FIGURE 2 is a prespective view of the carriage portion of the invention shown in FIGURE 1.

FIGURE 2 is a perspective view of the carriage 48 and its drive system. The carriage 48 preferably has affixed centrally to the normally lower surface thereof, a split nut 50 which engages a lead screw 52. The nut 50 may be expanded or widened by a suitable release mechanism 54 to disengage the halves of the split nut 50 from the threads of the lead screw 52. The split nut 50 can be used to disengage the carriage 48 from the lead screw 52 so that the carriage 48 can be manually pulled back, if desired, to reset or adjust it as may be required.

The mechanism 54 can comprise a lever-spring arrangement for widening the halves of the split nut 50 by means of a lever mechanism acting against the force of a spring which normally causes the halves of the nut 50 to engage the threads of the lead screw 52. The mechanism 54 may, alternatively, comprise a screw arrangement wherein the halves of the nut 50 are moved together or apart by rotation of a screw connecting and holding the halves of the nut 50 in any fixed and precise separation. Other suitable mechanisms may, of course, be used.

The lead screw 52 is rotatably supported at its ends in bearings (not shown) which are suitably mounted to fixed structure of the lower body portion 24 of the carrying case 22. The plate structure 48c is also supported by suitable rollers (not shown) engaging fixed structure of the body portion 24, to permit reciprocating movement of the carriage 48. The various cooperative bearings, rollers and supporting structure along with other similar matter have been omitted from FIGURE 2 for clarity of illustration, of course, and are not necessary to show for an understanding of our invention.

A pulley 56 is affixed near one end of the lead screw 52 and is rotated in one direction or the other by a belt 58 which is driven by the upper half of another pulley 60 that is mounted near the upper end of a vertical shaft 62. The pulley 60 is axially affixed to the vertical shaft 62 which also mounts a large friction wheel 64 that is engaged by a smaller friction wheel 66. The wheels 64 and 66 can, of course, be a meshing gear and pinion. The smaller wheel 66 is mounted on the output shaft of a motor 68. The lower half of the pulley 60 drives a belt 70 which engages the drive pulley 72a of a one-way clutch 72. A sprocket wheel 74 is mounted on the output shaft 72b of the one-way clutch 72 and engages perforations or holes 36a in the paper 36 to drive the same.

When the motor 68 is energized to rotate in one direction, the carriage 48 is moved by lead screw 52 from a forward position to the rear of the carrying case 22, and when the motor 68 is energized to rotate in the opposite direction, the carriage 48 is moved from a rearward position forward towards the front of the case 22 to reset the carriage 48 for another recording. The one-way clutch 72 is engaged to drive the paper 36 when the carriage 48 is being driven forwardly to return towards the front of the carrying case 22.

Another motor 76, smaller than the motor 68, is mounted to the lower surface of the arm 48a to drive the shaft 46a and its pulley 44a. The band 42 is under tension between pulleys 44a and 44b, and is frictionally driven by the pulley 44a. Of course, the pulleys 44a and 44b can be gears instead, and the band 42 can be suitably toothed to mesh with the teeth on such gears. Thus, the pens 40 are driven repeatedly around, and as each pen moves from pulley 44a to pulley 44b, the pen engages the paper 36 on the raised platen 38 (FIGURE 1) and sweeps across it in a straight line. The pens 40 produce visible marks when they are electrically energized by a control circuit described later.

While three pens 40a, 40b and 40c are shown, a greater or lesser number of equally spaced pens may be used. However, the speed of the motor 76 should be such in comparison with the speed of motor 68 and its driving mechanism, that the cyclic speed of the pens 40 in sweeping longitudinally across the paper 36 is relatively fast with respect to the lateral (front to rear direction) speed of the carriage 48. Thus, as the carriage 48 moves from a forward position in which a pen 40 would sweep across the paper 36 near the forward edge thereof, a relatively large number of parallel longitudinal sweeps would be made by the pens 40 across the paper 36 as the carriage 48 moves to its back or rear position.

The parallel longitudinal sweeps are preferably closely spaced laterally adjacent to each other but not contiguously so, however. It is readily apparent, of course, that each pen 40 engages the paper 36 only as it moves from the front of pulley 44a to the front of pulley 44b because of the raised condition of the paper 36 on the platen 38, which permits the points of the pens 40 to touch or bear on the surface of the paper 36. The pens 40 do not write when traveling between the rear of pulleys 44a and 44b because the ends or tips of the pens 40 circumscribe a lateral diameter about each pulley which is greater than the width of the paper 36.

A control switch 78 having a frictionally held arm 78a is operated with movement of the carriage 48. The arm 78a remains set in any position by friction. However, the arm 78a is normally in one position engaging a contact 78b or in another position engaging another contact 78c. The arm 78a itself is connected to a voltage source supplying −28 volts, for example, the contact 78b is connected to the control coil 80a of a relay 80, and the contact 78c is not connected to anything. The arm 78a is, of course, suitably insulated from the plate structure 48c and stop pins 82a and 82b which are affixed to structure of the carrying case 22.

The pins 82a and 82b are positioned with respect to the carriage 48 so that the arm 78a engages the pins near the respective limits of rearward and forward travel for the carriage 48. For example, as the carriage 48 nears its rearward limit of travel, the arm 78a engages the pin 82a as shown in FIGURE 2 and rotates the arm 78a until it engages the contact 78b. The control coil 80a is energized to actuate the relay 80 which causes reversal of the motor 68. The pens 40 are stopped from their cyclic movement and the carriage 48 is moved from its rearward limit position forwardly. At the same time, the one-way clutch 72 is engaged to advance the paper 36 a proper amount.

The arm 78a is frictionally held in engagement with the contact 78b until the carriage 48 nears its forward limit position. The arm 78a then engages the pin 82b which opens the circuit connecting power to the control coil 80a to de-energize the relay 80. When the relay 80 is de-energized, the motor 68 is reversed to start driving the carriage 48 in a rearward direction. The machine is now reset for recording another pattern on a section of the paper 36, and its power can be turned off at this time if another recording pattern is not desired. When it is desired to make the next recording pattern, power to the machine is (manually) turned on. The motors 68 and 76 are again energized to drive the carriage 48 and the pens 40. It is noted that the carriage 48 momentum is enough, and the distance between contacts 78b and 78c is such that the arm 78a is brought to engage the contact 78c for reset. The arm 78a is then frictionally held in engagement with contact 78c as the carriage 48 is moved rearwardly.

Whenever the pens 40 are driven, a multiple point cam 84 axially secured to shaft 46b is also rotated to actuate a switch 86 at each point. The cam 84 preferably has a number of points 84a corresponding to the number of pens 40. The switch 86 has, for example, a grounded pole so that as the pole is actuated by the cam points 84a, a ground (positive relative to a negative supply) pulse is produced each time which is used in a control circuit to regulate the speed of the motor 76. The cam 84 is positioned with respect to the pens 40 such that a ground (positive) pulse is produced whenever a pen has swept across the paper 36 and reaches a certain position in its travel along the recording paper. The pens 40 are always driven at least at a relatively slow idling speed. It is noted that the pens 40 are equally spaced about the band 42, and the points 84a are correspondingly equally spaced about the periphery of the cam 84. The cam 84 and associated switch 86 can, of course, be mounted to be driven and operated off the shaft 46a.

FIGURE 3 shows a schematic block diagram of our invention. The microphone 30 can be held against the chest over the heart of a patient and the electrical signal output thereof is fed to a preamplifier 88. The output of the preamplifier 88 is, in turn, fed to an automatic gain controlled amplifier 90. Automatic gain control serves to keep the average level of all signals constant in order to compensate for variations in microphone positioning and thicknesses of the chest wall of different patients. The preamplifier 88 and the automatic gain controlled amplifier 90 are conventional devices and need not be shown in detail.

The output of the amplifier 90 is provided to a modulator 92 and to a synchronizing signal filter 94. The output of the amplifier 90 can also be applied to a power amplifier 96 which drives a speaker 98 on closing of a switch 100. The output of the amplifier 96 can also be applied to headphone 32 by closing a switch 102.

Heterodyne oscillator 104 provides a variable frequency signal which is combined with the output signal of amplifier 90 by the modulator 92. The frequency of the oscillator signal is varied by a suitable coupling means 106 which is actuated by movement of carriage 48 (FIGURE 1) laterally with respect to the paper 36 and mechanically controls the adjustment of the oscillator 104. The frequency of the oscillator signal is progressively decreased from a first predetermined maximum frequency to beat with the low end of a selected frequency range to a second predetermined minimum frequency thereof to beat with the high end, corresponding respectively with the limits of forward and rearward travel of the carriage 48.

The modulated output signal from the modulator 92 is a combination of the original (amplified) signals and the sum and difference beats of the original (amplified) signals and the frequency of oscillator 104. Filtering is obtained by the intermediate frequency (I-F) amplifier which is tuned to a fixed frequency that is higher than any of the heart sound signals. The I-F amplifier responds only to signals at a frequency which will add to the oscillator frequency to equal the fixed intermediate frequency.

As the oscillator 104 is progressively tuned to a lower frequency by gradual motion of the carriage 48, laterally over the surface of the paper 36, it beats with progressively higher signal frequencies of the original (amplified) signals to produce a frequency equal to the I-F frequency. This system acts as a selective filter which can be tuned through the range of heart sound frequencies in accordance with lateral motion of the carriage 48. Output of the I-F amplifier 108 is coupled to pen-write circuitry 110.

The circuitry 110 electrically energizes the band 42 which can be made of suitably conducting material such that the pens 40 will produce markings on the paper 36 while contacting the surface thereof, as indicated for the pen 40c. The pen-write circuitry 110 operates whenever an input signal thereto exceeds a preset, predetermined minimum level.

The motor 68 has a field 68a which is energized by −28 volts as indicated in FIGURE 3. The motor 68 is shown mechanically connected to the coupling means 106 to drive the carriage 48 and vary the frequency of the output signal of the oscillator 104. Movement of the carriage 48, of course, also actuates the arm 78a of switch 78 between the contacts 78b and 78c. As shown, the arm 78a is connected to −28 volts, and the contact 78b is connected to ground through the control coil 80a of the relay 80.

The relay 80 has three two-position poles 80b, 80c and 80d which are respectively associated with three pairs of contacts 80e and 80f, 80g and 80h, and 80i and 80j. The contacts 80e and 80h are both connected to one side of the armature of the motor 68, and the contacts 80f and 80g are both connected to the other side of the armature. The pole 80b is connected to −28 volts, and pole 80c is connected to ground as shown. Thus, the motor 68 will be energized to rotate in one direction when the relay 80 is not energized, and will rotate in another direction when the relay 80 is energized.

The relay contact 80j is connected to one side of the armature of motor 76, and the other side of which armature is grounded. The pole 80d is connected to the output of a power pulse circuit 112 having an input connected to −28 volts. The −28 volts is also connected to energize the field 76a of the motor 76. The output of the power pulse circuit 112 will energize the motor 76 when the relay 80 is not energized.

As indicated in FIGURE 3, the output of the armature of the motor 76 is mechanically connected to drive the pulley 44a and the multiple pointed cam 84. Thus, the band 42 and hence the pens 40 are not driven when the switch arm 78a of the switch 78 engages its contact 78b and energizes the relay coil 80a. Accordingly, the band 42 and the pens 40 are stopped while the motor 68 is reversed in direction of rotation to return the carriage 48 back to its forward limit position and power turned off to stop the machine if another pattern recording is not desired.

The output synchronizing signals from the filter 94 are used to turn on or trigger the artificial heart beat generator 114, which is a conventional bistable multivibrator circuit. This multivibrator is turned off or reset by closure of switch 86 which is actuated by cam 84. Each synchronizing pulse turns on generator 114 and it remains on until the pen drive mechanism travels to the point where switch 86 is actuated. This produces variable width output pulses which are amplified by the power pulse amplifier 112 and used to control and synchronize the speed of the motor 76.

The power pulse amplifier 112 also provides, through a suitable resistor (R5 in FIGURE 9), a constant idling or minimum power to the motor 76. This reduces the amount of controlled power needed for changing motor speed over the range desired.

The power pulse circuit 112 normally provides a constant idling power to the motor 76, which idling power is increased by variable width power pulses controlled by signals from the generator 114 to produce variable width power pulses which are applied to the armature of the motor 76.

The leading edge of an output pulse from generator 114 establishes and coincides with the leading edge of a corresponding power pulse from circuit 112. However, the pulse widths of the output pulses from the generator 114 are controlled by switch 86 which is actuated by the cam 84 to terminate or establish the trailing edge of an output pulse from the generator 114. The cam 84 is, of course, mechanically coupled to the output of the motor 76 and is a measure of the position of the pens 40 relative to a reference position on the surface of the paper 36. This requires, of course, that there be no slippage between the drive pulley 44a and band 42.

Switch 86 is operated to establish the pulse width of each output pulse from the motor pulse generator 114. In this way, the speed of the pens 40 is synchronized with the pulse rate from the filter 94 so that a constant distance is covered by each pen for various pulse rates over a selected range. For example, at some particular rate of output pulses from the filter 94, the motor 76 and the pens 40 will be driven at a certain corresponding speed. If the rate of the output pulses from the filter 94 should increase, the output pulses from the generator 114 will also increase in rate. The rate of the power pulses from circuit 112 is thus similarly increased. This will start each power pulse sooner.

Since the cam 84 must be driven by motor 76 a certain distance before the switch 86 is actuated, and a corresponding output pulse from the generator 114 is terminated with each actuation of the switch 86, the speed of the motor 76 will be increased because the average power provided thereto will be greater over each cycle of the higher frequency signals now appearing from the circuit 112. The net result is that the increase in speed of the motor 76 drives each of the pens 40 over approximately the same distance at the new frequency as it did originally.

Similarly, should the rate of the output pulses from the filter 94 become slower, the rate of the output pulses from the generator 114 is also decreased such that less frequent power pulses will be supplied to the motor 76. This will start each power pulse later. Since the cam 84 must be driven by the motor 76 a certain fixed amount before the switch 86 is operated to terminate an output pulse from the generator 114 and hence the corresponding power pulse from circuit 112, the average power provided to the motor 76 is decreased. Thus, the pens 40 are driven at a slower speed to cover the same distance on paper 36 for output signals from the filter 94 of a lower rate than before. Correct speed for the motor 76 and pens 40 are maintained over a relatively wide predetermined range of frequency or pulse rate variations to produce charts of the same, uniform size.

Idling power alone provided to the motor 76 produces a minimum pen speed on paper 36 corresponding to a minimum rate output signal from filter 94, and idling power plus a power pulse which has a width covering the full cycle of the output signal from generator 116 produces a proper pen speed corresponding to a maximum rate output signal from filter 94. Thus, more frequent pulses, at an increasing width power pulse for each cycle of the output signal from filter 94 are added to the idling power to motor 76 for an increasing frequency of the output signal from filter 94.

Since the pens 40 are driven at a speed which is variable the rate of a variable rate synchronizing signal, pulse rate marker 118 is provided to record this information by producing marks (118a and 118b in FIGURE 10) on the paper 36 in response to the beginning of each output pulse signal from the artificial heart beat generator 114.

The pulse rate marker 118 can be a conventional differentiator circuit which produces a narrow pulse from the leading edge of each output pulse from the generator 114. The narrow pulses are applied to the pen-write circuitry 110, causing a very short line to be drawn on the record paper. These small periodic marks on the paper 36 indicate the pen speed which is directly related to the repetition rate of the output signals from the filter 94. This gives a record of the patient's heart rate and also shows any changes of rate that occur during a test. Details of the conventional differentiator circuitry of the pulse rate marker 118 are not shown.

Figure 4:
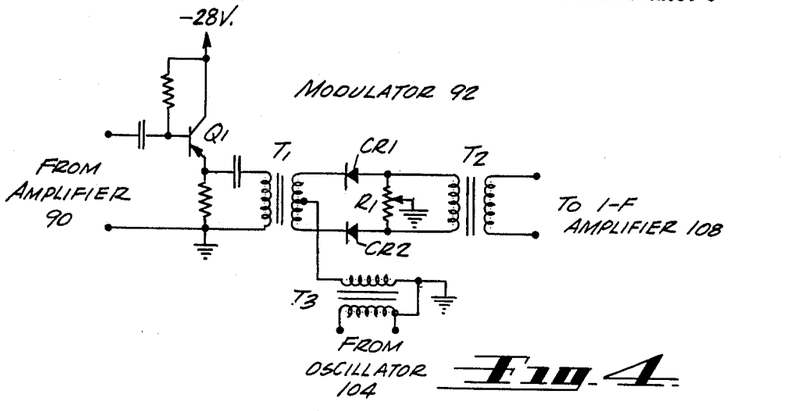
FIGURE 4 is a wiring diagram of an illustrative modulator circuit for the invention.

FIGURE 4 shows a preferred circuit for the modulator 92. As can be seen, the modulator circuit includes a transistor Q1 connected in an emitter follower circuit having an input connected to the output of the automatic gain controlled amplifier 90 and an output connected to the primary winding of a transformer T1. The secondary of the winding of the transformer T1 is connected to ends of a balance control potentiometer R1 through respective, negatively oriented diodes CR1 and CR2 which are, for example, type IN462 diodes. The anodes of the diodes of CR1 and CR2 are connected to respective ends of the primary winding of the transformer T2 and the secondary winding of the transformer T2 is connected to the intermediate frequency amplifier 108.

The output signal from oscillator 104 is applied to the primary winding of a transformer T3. One end of the secondary winding of the transformer T3 is connected to the center tap of the secondary winding of T1, and the other end of secondary of transformer T3 is connected to ground as shown. Thus, as is apparent from FIGURE 4, a modulating frequency signal is applied between the centers of a bridge circuit, and a modulated output signal is obtained across the ends thereof. Modulation or combination is accomplished in the arms of the bridge circuit including respective halves of the secondary winding of the transformer T1, and diodes CR1 and CR2.

Figure 5:
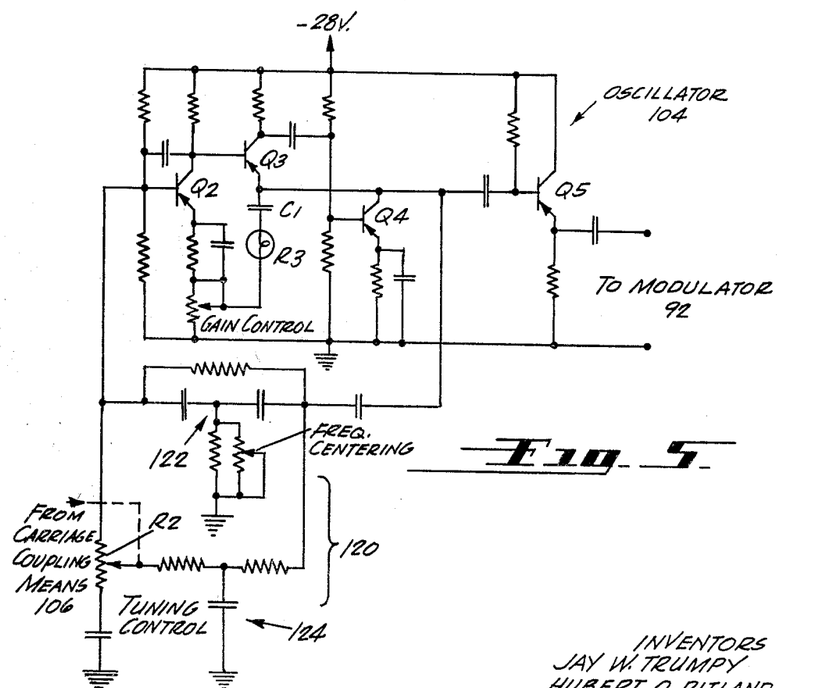
FIGURE 5 is a wiring diagram of an illustrative heterodyne oscillator circuit for the invention.

FIGURE 5 shows a preferred circuit for the oscillator 104. The transistors Q2, Q3, and Q4 are connected in respective common emitter amplifier circuits, and the transistor Q5 is connected in an emitter follower circuit. Feedback network 120 connects the output of the transistor Q4 back to the input of the transistor Q2. This feedback network 120 includes parallel branches of a bridged-T filter network 122 and a pi filter network 124.

The pi filter network 124 includes a tuning control potentiometer R2 having an adjustable wiper which is mechanically varied by the coupling means 106 in accordance to the movement of the carriage 48. Thus, the output frequency from the oscillator 104 is varied with movement of the carriage 48.

Gain control is effected by a series network including a negative resistance element R3 and capacitor C1. The oscillator 104 is a tuned oscillator circuit which is variable in frequency from, for example, 2,000 to 3,200 cycles per second (c.p.s.). The output of the oscillator 104 is applied to the primary winding of the transformer T3 shown in FIGURE 4.

Figure 6:
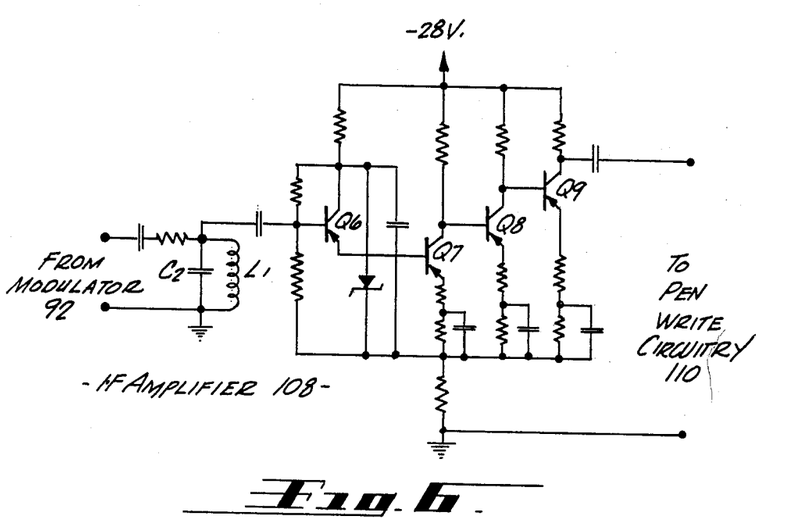
FIGURE 6 is a wiring diagram of an illusrtative intermediate frequency amplifier for this invention.

FIGURE 6 illustrates a preferred circuit of the intermediate frequency amplifier 108. The amplifier 108 is a fixed frequency amplifier having a 2,000 c.p.s. resonant tank including inductor L1 and capacitor C2 located at the input thereof. The amplifier 108, as shown, has four stages of amplification which include the transistors Q6, Q7, Q8 and Q9 connected in generally conventional circuitry. The output of the intermediate frequency amplifier 108 is connected to the input of the pen-write circuitry 110.

Figure 7:
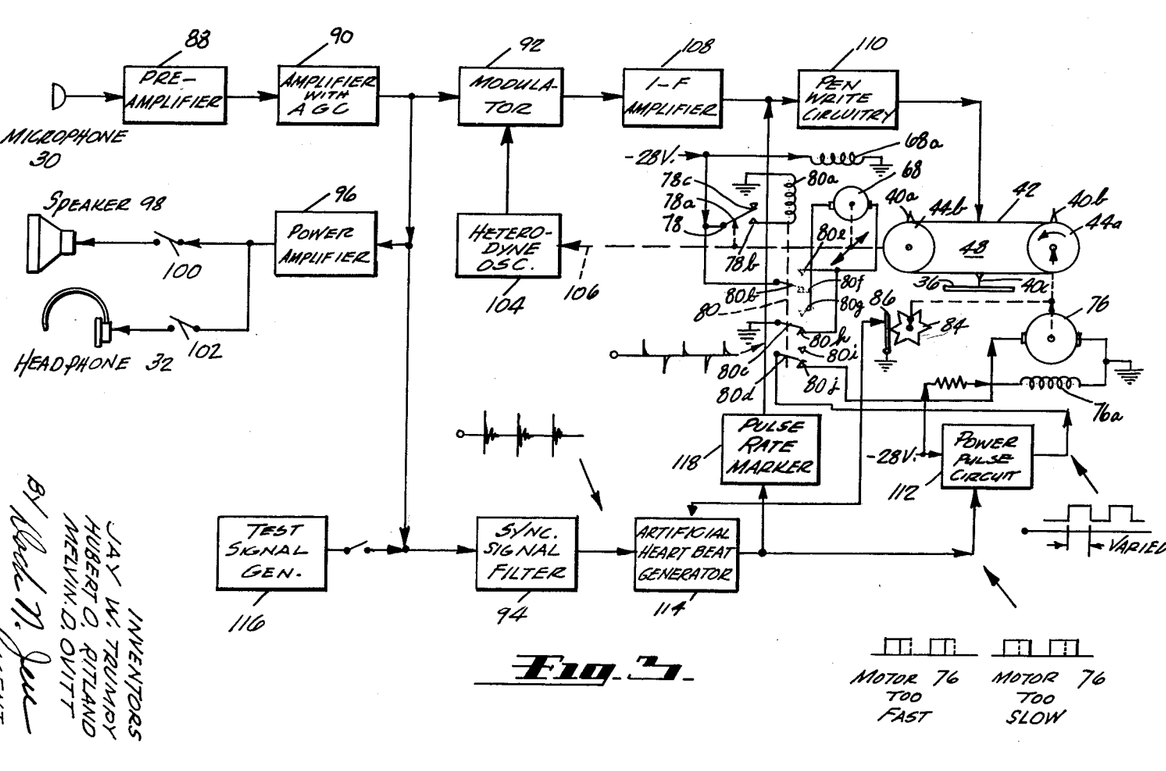
FIGURE 7 is a wiring diagram of an illustrative pen-write control circuit for this invention.

FIGURE 7 shows a preferred circuit diagram of the pen-write circuitry 110. The output of the intermediate frequency amplifier 108 is applied to the transistor Q10 connected in an emitter follower circuit which has its output connected to the gate electrode of a controlled rectifier CR3. As is well known, when a sufficient voltage is applied between the gate and cathode electrodes of the controlled rectifier CR3, the controlled rectifier is fired when its anode is positive a necessary amount relative to the cathode. Firing of the controlled rectifier CR3 thus energizes the pen 126. Power is supplied by means of the transformer T4 having, for example, 115 volts, 60 c.p.s. power applied to the primary winding thereof.

Once the controlled rectifier CR3 is fired it remains so until the anode voltage drops to zero or becomes negative with respect to its cathode. Thus, the pen 126 can become energized only during the positive half cycles of the 60 c.p.s. signal applied to the transformer T4. This frequency is sufficiently high enough, however, that the electrical marking action of the pen 126 appears to be continuous during the time that the pen is energized any length of time.

Figure 8:
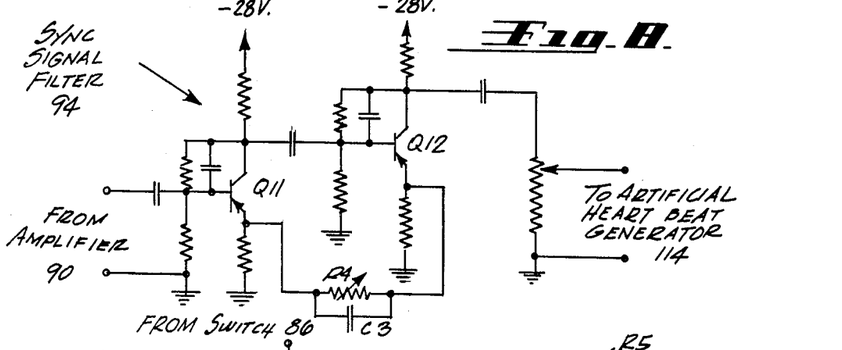
FIGURE 8 is a wiring diagram of an illustrative synchronizing signal filter for the invention.

FIGURE 8 shows a preferred circuit for the synchronizing signal filter 94. The output from the automatic gain controlled amplifier 90 is supplied to the input of the synchronizing signal filter 94 and the output from the filter 94 is connected to the artificial heart beat generator 114. As can be seen in FIGURE 8, the filter 94 comprises two transistors Q11 and Q12 connected in two amplifier stages having a feedback network including a variable resistor R4 and a parallel capacitor C3 connecting the emitters of the transistors Q11 and Q12 together. Circuit elements are chosen to select an output signal of a particular frequency which will establish a desired synchronizing signal. The synchronizing signal is normally that of a predominant beat sound of a heart, for example. The variable resistance R4 can be adjusted for different predominant sounds or frequencies of different persons, to cover a variety of sounds and pulse rates.

Figure 9:
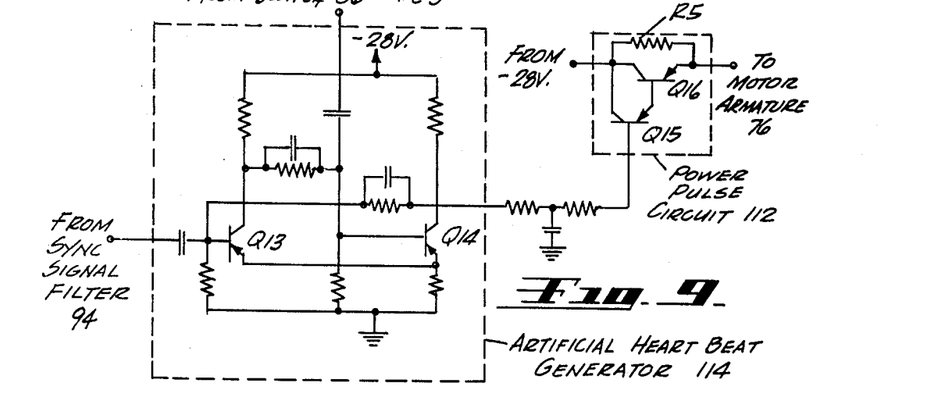
FIGURE 9 is a wiring diagram of an illustrative artificial heart beat generator circuit and power pulse circuit for the invention.

FIGURE 9 shows a preferred circuit for the artificial heart beat generator 114 and the power pulse circuit 112. The output from the synchronizing signal filter 94 is supplied to the input of the artificial heart beat generator 114 and the output of the generator 114 is suitably filtered and used to control the power pulse output of the circuit 112. The generator 114 preferably comprises two transistors Q13 and Q14 connected in a substantially conventional bistable multivibrator circuit.

The output signal from the artificial heart beat generator 114 energizes the cascaded transistors Q15 and Q16 such that an increased power pulse is provided from the circuit 112. Normally, when the transistors Q15 and Q16 are not conducting, idling power is provided through the shunting resistor R5 to the output of the circuit 112. The output from the power pulse circuit 112 is provided to the armature of the motor 76 when the relay 80 is not energized such that the relay pole 80d engages its contact 80j (FIGURE 3). The power pulses from the circuit 112 are varied in width such that the motor 76 is driven at a proper speed when it is energized.

As mentioned previously, the motor 76 is driven by power pulse circuit 112 which amplifies the pulses from artificial heart beat generator 114. Pulse generation is initiated by the output from the synchronizing signal filter 94 which triggers the transistor Q13 (FIGURE 9). The termination of each power pulse is controlled by switch 86 which is actuated by cam 84 causing a pulse to be applied to transistor Q14. This resets the multivibrator circuit of generator 114. The net effect is that if the pens 40 are moving too fast, cam 84 will be actuated sooner and cut the power pulse short. If the pens 40 are moving too slowly, there will be a slight delay before the cam 84 shuts off the power pulse to the motor. This longer pulse of power will speed up the pen motion to correct the speed and also automatically index the pen location to the same longitudinal position on the paper 36 for each part of one heart beat.

The net effect is that the output pulses from the power pulse circuit 112 will be varied in pulse width according to the pulse rate output of the heart beat generator 114 such that the motor 76 is driven at a variable speed to produce a substantially constant travel distance for each of the pens 40 on paper 36 for all frequencies or pulse rates of the output signal from the synchronizing signal filter 94 over a wide frequency or pulse rate range.

Figure 10:
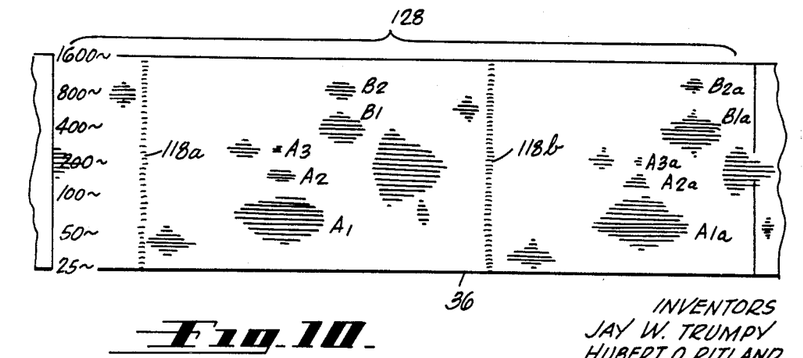
FIGURE 10 is a drawing showing a recording including various illustrative formations produced by the invention on a section of paper.

FIGURE 10 is a drawing showing a section 128 of the paper 36 having a pattern produced thereon by the stethoscopic spectrograph. The section 128 horizontally covers the time interval over, for example, two complete cycles of the synchronizing signal from the filter 94 (FIGURE 3). Vertically, the plot covers a frequency range from, for example, 25 c.p.s. to 1600 c.p.s. The pens 40 each make a horizontal sweep across the section 128 in rapid succession as the carriage 48 is moved in a lateral (vertical in FIGURE 10) direction together with a progressive variation in frequency of the output signal from the oscillator 104. The coupling means 106 is such that it varies the frequency of the oscillator 104 very slowly in comparison with the horizontal sweep velocity of each sweep of the pens 40 over the section 128 of the paper 36. Of course, it is possible to provide coupling means 106 of the nature which has an eccentric action that adjusts the frequency of the oscillator 104 quickly at the end of a sweep with little, if any, adjustment during the main sweep portion thereof. In this way, signal components of a substantially constant frequency are plotted on paper 36 during each sweep.

The spectrograph pattern over the first half of the section 128 shown in FIGURE 10 is similar to that of the second half of the section 128. By recording two substantially similar patterns over the section 128 of the paper 36, it is always possible to obtain a complete pattern over one full cycle of the input signal throughout the frequency range under consideration irrespective of what point is chosen as a reference. As can be seen from FIGURE 10, the pattern including the formations A1, A2, A3, B1 and B2 are duplicated over the section 128 by the pattern including the formations A1*a*, A2*a*, A3*a*, B1*a* and B2*a*. This assumes, of course, that the input signal to the stethoscopic spectrograph is not radically varied during the time that the patterns shown in FIGURE 10 are being recorded over the section 128 of the paper 36. If radical variation does occur, it is desirable that the recording shows it.

It is noted that certain types of heart sounds normally appear at some corresponding time of each cycle of a heart signal. These sounds result in frequency components being plotted in certain formations in accordance with the frequency selection caused by tuning of the oscillator 104. Thus, over one cycle of a substantially uniformly repeating heart signal, a composite picture of the various frequency components with respect to the time of one period is obtained. Accordingly, if certain, normal, high frequency components of an input signal are missing from, say, the latter half of a pattern, this would indicate that a certain valve of the heart is functioning improperly. While the input signal to the spectrograph is usually that of a patient's heartbeat, other similar signals can be recorded and any trouble can be determined by proper analysis of the recorded pattern.

An important feature of the invention is that the patterns are recorded by lines of uniform density. There are no shadings from dark to light as found in cathode ray oscillograph recordings. This allows the patterns to be photographed or otherwise duplicated without loss of information. The relative intensity of the individual sounds recorded is shown by the vertical width of the pattern. For example, a weak 300 c.p.s. sound may be recorded for the interval during which the filter is tuning from 295 to 305 c.p.s. A stronger 300 c.p.s. sound might be "heard" from 250 to 350 c.p.s.

Only sounds which exceed a pre-set minimum value are able to trigger the pen-write circuitry. If this threshold value is set too high, only a few small areas will be recorded. If the threshold is set too low, there will be so many sounds recorded, with each sound covering a large area, that it will be difficult to identify individual sounds.

The ability of the instrument to select signals which exceed a pre-set level is dependent upon the amplifier 90 which incorporates automatic gain control circuitry. Regardless of the positioning of the microphone 30 or transmission of sound vibrations through the chest walls of different patients, the amplifier 90 output is constant. This constant output consists of all the sound signals. The automatic gain control circuitry keeps the total of all signals at one level. Subsequent filtering by the modulator 92 and I-F stages of amplifier 108 then shows the individual sounds and a comparison of the relative strength of each signal.

This is similar to the action of A.G.C. circuits in radio receivers. The listener adjusts the volume control for the average sound level desired. Then all broadcast station programs will sound equally loud, but individual sounds will vary in loudness. In our spectrograph, the effect is that an equal amount of "ink," (or pattern area marked), will be used even though a pattern is radically different from a previous recording.

The pen-write circuitry 110, shown in FIGURE 7, is only able to "hear" the sounds, one at a time, as the filter is tuned through the sound range. This is comparable to tuning an audio filter through the sounds heard on one broadcast station. When the pen-write circuitry 110 receives a sound signal large enough to overcome the negative bias on the gate electrode of CR3 (FIGURE 7) the pens 40 are activated. The pen will stop writing if the signal level falls below the threshold level. This is because the anode of CR3 is supplied by alternating voltage. It stops conducting on the negative half of each cycle and must be re-triggered by the signal when the anode swings positive again.

Another particularly important feature of our invention is the fact that the moving pens 40 are synchronized with a patient's heart beats. The pens 40 move at a speed which corresponds to the heart rate, so that a pen will traverse one-half of the, for example, 10 inches long recording pattern area on paper 36 once for each beat. In addition, the pen position is automatically indexed to a particular heart sound which occurs once during each beat. By locking onto one particular synchronizing signal, the pen control drive holds the pens 40 in phase with the sequence of sounds of each heart beat. A pen is always traveling through the same horizontal (longitudinal) zone of the recorded pattern when any particular sound recurs.

Control of the motor speed and indexing of the pen position is done by varying the repetition rate and duration of power pulses which drive the motor 76. A small amount of continuous power is also fed to the motor 76.

The motor pulse repetition rate is automatically adjusted to match the heart rate. Indexing of the pen position so it stays in phase with the sequence of sounds within one heart beat is done mechanically. Every time a pen passes one point it triggers a switch 86 which terminates the power pulse to the motor 76.

A motor power pulse is started when the synchronizing signal occurs. This signal is a sound which happens once during each heart beat. The pulse is stopped when the pen has traveled to the switch 86.

In normal operation, when plotting a pattern, the pen will sweep halfway across the pattern before the synchronizing signal turns on a power pulse. When the pen reaches the end of the pattern, the switch 86 turns off the power pulse. The motor 76 is thus powered half the time, or for a 50% duty cycle.

When the instrument is first turned on, a synchronizing pulse turns on power to the motor 76. As a pen 40 starts moving slowly, other synchronizing pulses occur but have no effect because power is still on. When the pen finally reaches the switch 86, power is turned off. Because the pen is still moving slowly, it is hardly started across the pattern again before another synchronizing signal puts motor power back on. The duty cycle of motor power approaches 100% when the instrument starts.

If the instrument is plotting a pattern and the patient's heart rate slows, the pen speed will automatically slow and stay in synchronism. Since the pen speed was effectively too fast, a pen 40 will rush past the usual halfway point before a synchronizing signal starts a new motor pulse. This shortens the distance and time to the stop switch 86, resulting in a shorter power pulse to the motor 76. When the pen must slow down to stay synchronized, the duty cycle of motor power pulses becomes less than 50%.

Figure 11:
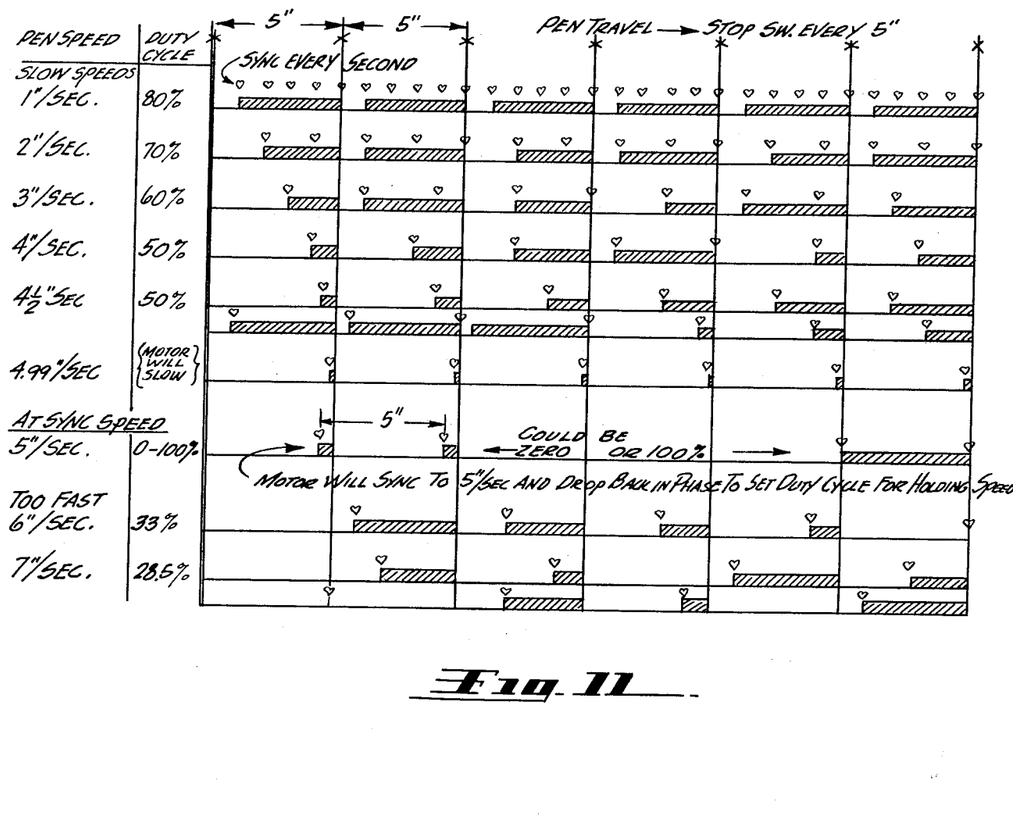
FIGURE 11 is a graph relating operation of the invention with various pen speeds.

FIGURE 11 shows how the motor power duty cycle varies with motor pen drive speed. When first started, the duty cycle is almost 100%. The duty cycle drops to 33% when speed is 40% greater than synchronous speed.

When the motor speed has increased to where it approaches synchronous speed, the duty cycle is determined by the phase relationship of the synchronizing signals and proximity of the pens 40 to the cut-off switch 86. A further speed increase shortens the instantaneous distance between the pens and cut-off switch. This slows the motor 76 because its duty cycle approaches zero. Slowing the motor 76 causes it to slip in phase until the duty cycle is sufficient to maintain synchronous speed. The pen speed is then synchronized with the heart rate and pen position is in phase with the synchronizing signals.

The chart of FIGURE 11 diagrammatically illustrates and explains the automatic operation of the pen motor synchronizing principle of our invention. As indicated in this figure, horizontal distance from the ordinate axis of the chart represents cyclic pen travel in, for example, inches. Pen travel is plotted for various pen speeds. Actuation of the switch 86 by the cam 84 (FIGURE 3) for each point of the cam 84 is indicated in FIGURE 11 by stop-switch markings (x) provided at equal 5 inches of pen travel intervals on the graph of FIGURE 11. Each pen 40 travels 10 inches on paper 36 for each sweep. The hatched markings made on the different pen speed plots of the graph represent the production or appearance of an output pulse from the power pulse circuit 112. Each power pulse is, of course, terminated by an actuation of the stop-switch 86.

For purposes of illustration, a dominant signal frequency or pulse rate of 60 c.p.s. has been assumed in making the graph of FIGURE 11. The small heart shaped markings indicate the appearance of each trigger pulse from the artificial heart beat generator 114 (FIGURE 3). These heart shaped markings therefore indicate the beginning of an output pulse from the power pulse circuit 112. Synchronized pen speed is shown as 5 inches per second for the assumed dominant heart frequency or pulse rate of 5 inches per second. Substantially constant pen speed is produced and maintained by the power pulses.

The hatched markings for pen speeds of 1 to 7 inches per second illustrate the variations of power pulses from circuit 112 at the respective pen speeds over a complete cycle of operation for all of the three pens 40. The second lower row of hatched markings at the pen speeds of 4.5 and 7 inches per second illustrate a respective following cycle of operation showing the continued variation of power pulses in response to the appearance of the trigger pulses from the artificial heart heat generator 114.

Where the pen speed is less than the synchronized pen speed of 5 inches per second, the power pulses produced in response to each output pulse from the artificial heart beat generator 114 at the assumed dominant frequency or pulse rate of 60 c.p.s. are generally not uniformly spaced or of equal duration over a complete cycle of operation. This is indicated by the irregular, hatched markings on the 1, 2, 3, 4, 4.5 and 4.99 inches per second plots. The pens 40 will accordingly be driven at a progressively increasing speed until the synchronized pen speed of 5 inches per second is achieved.

As can be seen from the graph of FIGURE 11, the regular and uniform, hatched markings for a pen speed of 1 inch per second show that over a complete repetitive cycle of operation, the motor 76 is supplied with a power pulse from the power pulse circuit 112 at least 80% of a sweep cycle. The duty cycle of motor 76 with respect to being driven by a power pulse averages 70% for a pen speed of 2 inches per second. As the pen speed increases towards the correct synchronized pen speed of 5 inches per second, the average motor duty cycle (with power pulses) progressively drops as the power pulses are averaged over an increasingly greater number of pen travel intervals. It can be seen from the plot for pen speed of 4.5 inches per second, power pulses are widely varied in duration over nine 5 inch pen travel intervals before repeating its cycle. The average is increasingly spread so that the motor 76 will slow down as the pens 40 approach synchronized speed. This effect is accentuated by the fact that the motor 76 requires more power at higher speeds.

The motor 76 will drive the pens 40 at synchronized speed which for the illustrative graph of FIGURE 11 may be approximately 5 inches per second after this speed is reached. The pens 40 are maintained at synchronized speed because any tendency for the motor 76 to slow down would be opposed by increasing power pulses thereto. However, a certain amount of power pulses is necessary to maintain correct sychronized speed. This is accomplished once synchronized speed is attained, in the process of achieving a steady state condition. The lack of power pulses at synchronized speed induces the motor 76 to slow but which results in producing power pulses thereto, causing a transient hunting period during which the motor 76 effectively slips in phase until a correct amount of power pulse is uniformly applied during every cycle of heart beat such that synchronized pen speed will be maintained. If the motor 76 tries to accelerate through the synchronized pen speed of 5 inches per second, for example, it will automatically approach zero added power pulse and slip back. The flywheel effect provided by the pulleys 44a and 44b will prevent the motor 76 from jumping through synchronized speed, and maintain a steady state condition.

If the motor 76 should drive the pens 40 too fast, the average power pulse for each 5 inch interval over a repetitive sequence of power pulses is significantly decreased by the appearance of intervals without any power pulse at all. As can be seen in FIGURE 11, the plot for a pen speed of 6 inches per second has two such empty intervals, and the plot for a pen speed of 7 inches per second has three such empty intervals over respective repetitive sequences of power pulses. Significant speed increases are therefore not prevented but yet any overspeed of the pens 40 is soon reduced and brought back to synchronized speed.

A modified version of our invention is shown in FIGURE 12. This modified version of the invention employs a stepper motor drive that results in a somewhat simpler instrument. As can be seen in FIGURE 12, the power pulse circuit 112, and cam 84 and switch 86 are not used. A pulse generator 130 which can be manually preset to a patient's approximate heart beat repetition rate is used instead to provide power pulses to a stepper motor 132 that is connected to drive pulley 44a. Control of the stepper motor 132 is obtained through use of relay 134.

The artificial heart beat generator 114a is a one-shot multivibrator having a relatively narrow output pulse which is produced in response to an input trigger pulse thereto. This generator 114a differs from the generator 114 of FIGURE 3 in that it is not a bistable multivibrator using an output pulse length control connection. The output of the generator 114a is suitably applied to the relay coil 134a. When the relay coil 134a is energized, the poles 134b and 134c of the relay 134 are actuated such that the pole 134b connects +28 volts to the coil 134a to lock the relay, and the pole 134c connects the output of the pulse generator 130 to the stepper motor 132. Carriage 48 and oscillator 104 are controlled as before.

Mechanical switch 136 is driven by the pulley 44a, and has a rotating arm which is connected to ground and a contact that is connected to the relay coil 134a through a capacitor C4. The capacitor C4 is shunted by an energy absorbing resistor R6. The switch 136 is utilized instead of the cam 84 and switch 86 of FIGURE 3. When the switch 136 is closed after a pen has made its plot on the paper 36, the capacitor C4 acts to short the relay coil 134a momentarily to de-energize the lockup circuit by releasing the pole 134b.

In operation, the pulse generator 130 is preset according to the patient's approximate heart rate. The patient's approximate heart rate is first measured, and then the knob 130a is set on the corresponding marking on the calibrated dial 130b. This produces output pulses from the generator 130 of a frequency which drives the stepper motor 132 at a constant speed that causes a pen (such as pen A) to sweep over the paper 36 a predetermined distance for each cycle of the heart signal. This predetermined distance is, of course, the same when the knob 130a is correctly set against dial 130b for other heart rates over the entire range of the calibrated dial 130b. The diameter of the pulley 44a is such that one complete revolution thereof will move the pen A from the beginning of a recording section of the paper 36 to a point at the end of the section, at which time the pen B is then positioned at the beginning of the section.

Three synchronizing signals per sweep of a pen are used. At the start of the first synchronizing pulse from the generator 114a, the relay 134 is energized and the stepper motor 132 is driven by the output of the pulse generator 130 at the constant preset speed. The stepper motor 132 is driven at a speed wherein two heart cycles and a fraction are plotted on the paper before the mechanical switch 136 is closed to de-energize the relay 134. Since more than a complete heart cycle is plotted on the paper 36, the output pulses from the pulse generator 130 need not drive the stepper motor in exact proportion with the patient's heart rate. After the relay 134 is de-energized, the next trigger pulse from generator 114a will be effective to energize the relay 134 and start another cycle of operation. Generator 130 is turned off on carriage 48 return. Instead of a stepper motor, a synchronous motor can, of course, be used. A variable output speed can be obtained by using adjustable gearing means, for example, which can be preset to produce an appropriate output speed therefrom according to the measured approximate heart rate of a patient. The output of the gearing means is then used to drive the pulley 44a through suitable coupling means such as a magnetic clutch controlled by a relay similar to relay 134. A magnetic clutch is preferably used to provide rapid coupling and de-coupling of the adjustable output of the gearing means to the pen drive mechanism.

Figure 13:
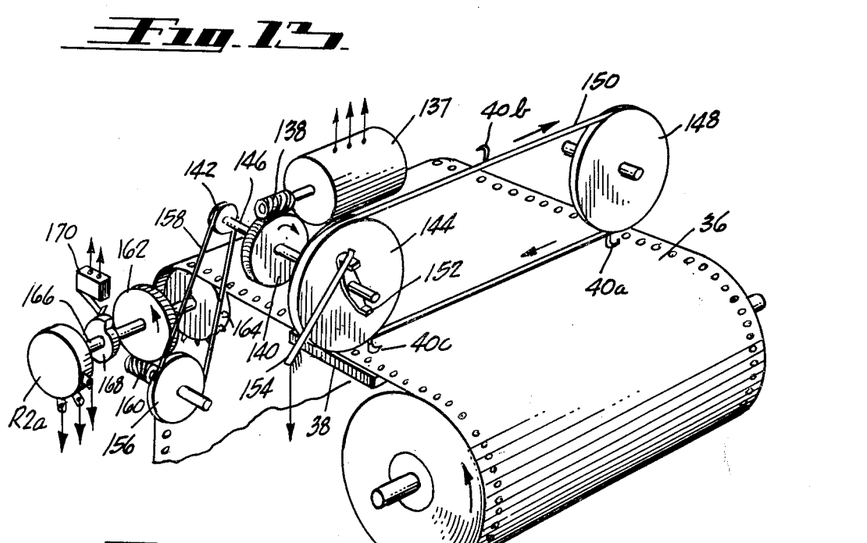
FIGURE 13 is a perspective view, somewhat fragmentary, of another version of our invention.

FIGURE 13 shows another version of our invention which is structurally simplified still further. The carriage 48 has been eliminated and only a single motor is used for driving the pens 40 and paper 36. Motor 137 drives a worm 138 which engages a worm gear 140 mounting pulleys 142 and 144 on respective ends of gear shaft 146. The pulley 144 is connected to a similar pulley 148 through an endless band 150. The pulley 148 is rotatably mounted, and is rotated with movement of the band 150 through tensional friction between the band 150 and the rim of the pulley 148. The band 150 is electrically conductive and mounts pens 40.

The pens 40a, 40b and 40c are mounted equally spaced on the band 150, and sequentially engages the surface of the paper 36 which is electrically marked by the pens 40. The pulley 148 is electrically conductive and is suitably connected to the common junction between the secondary winding of transformer T4 and its series capacitor as shown in FIGURE 7. The pulleys 144 and 148 are positioned as shown in FIGURE 13 so that the pens 40 are driven in a plane which is perpendicular to the surface of the paper 36 over the vacuum platen 38. The platen 38 also serves as a ground plane which is connected to the other end of the aforementioned capacitor of FIGURE 7.

The pulley 144 is not electrically conductive like the pulley 148. However, mounted to rotate with the pulley 144 on the shaft 146 is a two-point cam 152 which is suitably connected to ground. The ends of the cam 152 engages a contact element 154 which is connected to the artificial heart beat generator 114. The cam 152 therefore corresponds to the switch 86 of FIGURE 3. The pulleys 144 and 148 are, of course, constructed to provide a suitable flywheel effect.

The pulley 142 drives a larger pulley 156 through a connecting belt 158. The pulley 156 drives a worm 160 which meshes with a worm gear 162. Rotation of the worm gear 162 drives a sprocket wheel 164 mounted on one end of shaft 166, and a cam 168 and the wiper of a potentiometer R2a mounted on the other end thereof. The sprockets of the wheel 164 engage the holes in the paper 36 to drive the same, and the cam 168 operates a stop switch 170 once each revolution. The potentiometer R2a is a 360 degrees continuous rotation device and corresponds to the potentiometer R2 shown in FIGURE 5.

The paper 36 in FIGURE 13 has an effective writing width of 10 inches, and the pulleys 144 and 148 are suitably spaced so that the pens 40 will contact the surface of the paper 36 this distance for each sweep of a pen 40. The pulleys 144 and 148 preferably are spaced 10 inches apart, and have 10 inch effective circumferences for engaging the band 150. Dimensions of the components are such that shaft 146 is driven at 30 r.p.m., pulley 156 at 10 r.p.m. and shaft 166 at ¼ r.p.m. The sprocket wheel 164 has a root diameter of 1.272 inch, for example.

Figure 14:
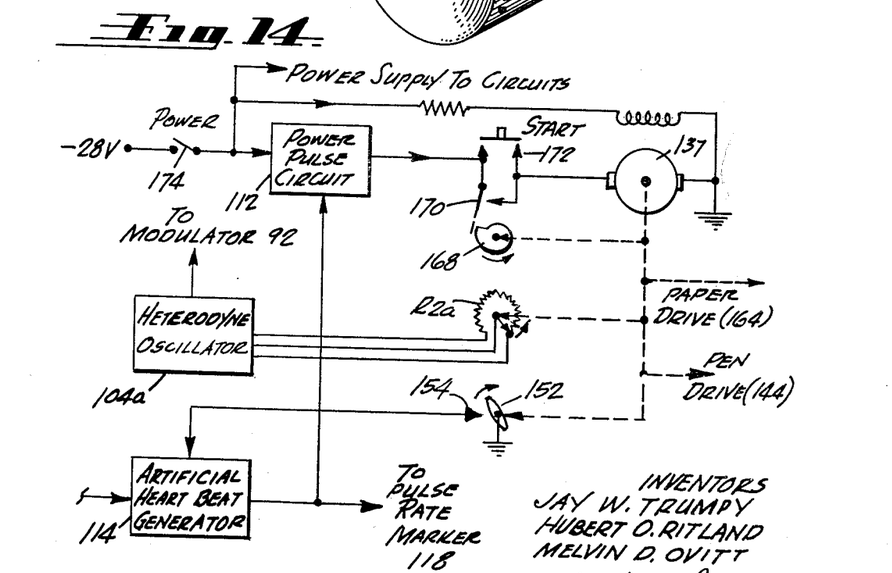
FIGURE 14 is a circuit diagram for the version of invention shown in FIGURE 13.
Figure 17:
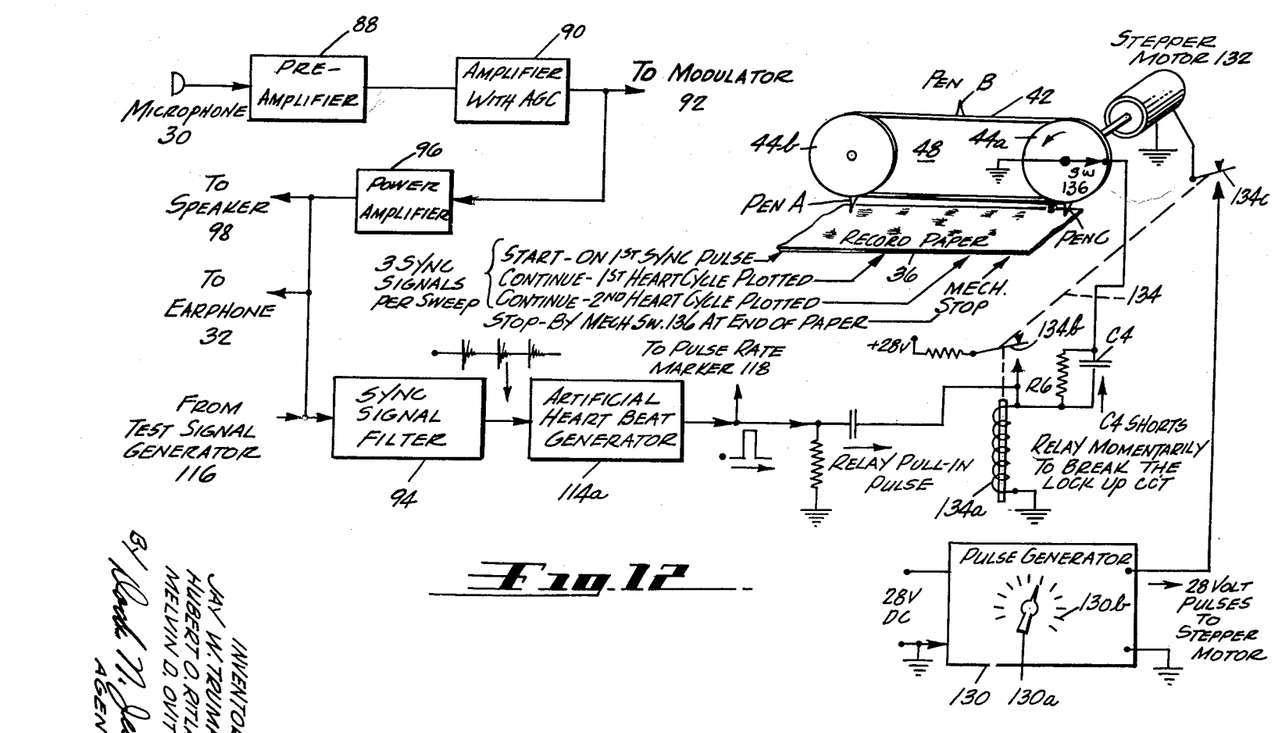

FIGURE 14 shows a circuit diagram for the version of our invention shown in FIGURE 13. The circuit of FIGURE 14 is fragmentary in that the rest of the circuit which is not shown is the same as certain parts of the circuit of FIGURE 3. The relay 80 in FIGURE 3 is not needed since a movable carriage is not used and, of course, motors 68 and 76 have been replaced by a single motor 137. Cam 152 and contact element 154 corresponds to switch 86, as mentioned above. The circuit of FIGURE 14 includes a stop switch 170 actuated by cam 168, and a start pushbutton switch 172 which are not used in the circuit of FIGURE 3. Other than the circuit connections shown in FIGURE 14, the remainder of the circuit can be the same as that of FIGURE 3.

By having a single motor 137 driving both pens 40 and paper 36, recording patterns are produced which differ from those made by the machine shown in FIGURES 1, 2 and 3 in that the parallel spacing between marks made by the pens 40 would be uniformly spaced on various successive sweeps since greater pen speed would result in greater paper speed. Thus, the faster that the pens 40 are driven, the faster will the paper 36 be moved at right angles thereto, as can be easily seen in FIGURE 13. This means that for persons having different heart rates, their respective records in the usual steady state conditions, would produce records on paper areas covering the same width and length.

Operation of the version of our invention shown in FIGURES 13 and 14 is virtually automatic in producing a pattern recording. Closure of the power switch 174 in FIGURE 14 supplies power to the various circuits. Depressing the start pushbutton switch 172 momentarily will energize the motor 137 which drives cam 168, the wiper of potentiometer R2a, cam 152, paper drive sprocket wheel 164 and pen drive pulley 144. Cam 168 is contoured to cause switch 170 to close and shunt start switch 172 in order to continue supplying power (idling power and power pulses) to motor 137 after switch 172 is released. Variation of the resistance of potentiometer R2a will vary the output frequency of oscillator 104a which is similar to the oscillator 104 shown in FIGURE 5. Cam 152 functions as a switch with the contact element 154 to control the length of the power pulses from the circuit 112 in the same manner as the switch 86 in FIGURE 3.

After a complete pattern is recorded on the paper 36, the stop switch 170 is actuated (opened) by cam 168 which has then made one complete rotation. This removes power from motor 137 and stops further recording. The wiper of the potentiometer R2a has also made a complete revolution. If another recording pattern is desired, the pushbutton switch 172 can be depressed again. Once motor 137 is started on a recording cycle, emergency stops must be made by opening power switch 174.

It should be apparent from the foregoing description that the particular versions or embodiments of our invention described above and shown in the drawings are exemplary of, and not restrictive on, our broad invention, and that various changes in design, structure and arrangement may be made in the invention without departing from the legitimate and valid scope of the appended claims.

We claim:
1. A stethoscopic spectrograph, comprising:
recording material having a surface adapted to be marked;
means for moving said recording material over a recording platen in a first direction;
pen means movable in a second direction at substantially right angles to the first direction, said pen means being energizable to mark the surface of said recording material;
microphone means adapted to pick up generally periodic sounds and convert the same into electrical signals;
means for moving said recording material and said pen means at first and second speeds, respectively;
means coupled with said moving means and adjustably varied thereby for detecting different frequency components of the electrical signals and energizing said pen means therewith; and
means for varying movement speed of said pen means in response to the periodic rate of a predominant sound of the periodic sounds picked up by said microphone means, so that said pen means is moved substantially equal distances over respective periods of different periodic rates of the predominant sound of the periodic sounds whereby recordings of uniform size are produced over a wide range of different periodic rates of the predominant sound of the periodic sounds.

2. The invention as defined in claim 1 wherein said pen means includes a plurality of energizable pens which are mounted in spaced relationship on an endless band, said band being driven by said moving means whereby said pens are moved at the second speed with respect to the surface of said recording material.

3. The invention as defined in claim 1 wherein said means for detecting different frequency components of the electrical signals includes a heterodyne oscillator having an output signal which is adjustable in frequency according to the movement of said recording material in the first direction, and a modulator for combining the output signal of said oscillator with the electrical signals from said microphone means whereby the combined signals can be adapted to energize said pen means.

4. The invention as defined in claim 1 wherein said moving means is adapted to drive said recording material and pen means at respective first and second speeds which are proportional to each other.

5. The invention as defined in claim 1 wherein said means for varying movement speed of said pen means includes filter means for obtaining a predominant sound signal of the periodic sounds, means for applying a power signal to said means for moving said pen means in the second direction in response to the predominant sound signal, and means connectably driven with said pen means for stopping said power signal at a predetermined position of said pen means in the second direction with respect to the surface of the recording material whereby the power signal is reduced in average duration when the periodic rate of the predominant sound signal is low and increased in average duration when the periodic rate of the predominant sound signal is high.

6. The invention as defined in claim 1 including means responsive to a predominant sound signal of said periodic sounds to energize said pen means and produce a rate marking on said recording material for each cycle of the predominant sound signal.

7. A stethoscopic spectrograph, comprising:
recording material having a surface adapted to be marked;
means for positioning a section of said recording material on a recording platen;
carriage means movable along a first axis with respect to the surface of said recording material;
pen means movably mounted to said carriage means and movable along a second axis which is substantially at right angles to the first axis, said pen means being energizable to mark the surface of said recording material;
microphone means adapted to pick up generally periodic sounds and convert the same into electrical signals;
means adjustably coupled with said carriage means and responsive to movement thereof in a predetermined direction along the first axis, for detecting different frequency components of the electrical signals and energizing said pen means therewith;
means for driving said carriage means in the predetermined direction along the first axis with respect to the surface of said recording material;
means for driving said pen means with respect to the surface of said recording material; and
means for varying movement speed of said pen means in response to the periodic rate of a predominant sound of the periodic sounds picked up by said microphone means, so that said pen means is moved substantially equal distances over respective periods of different periodic rates of the predominant sound of the periodic sounds whereby recordings of uniform size are produced over a wide range of different periodic rates of the predominant sound of the periodic sounds.

8. The invention as defined in claim 7 wherein said recording material includes paper having a treated surface for producing visible markings thereon when said pen means is electrically energized, and said pen means includes a plurality of energizable pens which are mounted in spaced relationship on an endless band, said band being driven by said means for moving said pen means whereby sair pens are moved along the second axis with respect to the surface of said recording material.

9. The invention as defined in claim 7 wherein said means for detecting different frequency components of the electrical signals includes a heterodyne oscillator having an output signal which is adjustable in frequency according to the movement of said carriage means along the first axis, and a modulator for combining the output signal of said oscillator with the electrical signals from said microphone means whereby the combined signals can be adapted to energize said pen means.

10. The invention as defined in claim 7 wherein said means for varying movement speed of said pen means includes filter means for obtaining a predominant sound signal of the periodic sounds, means for applying a power signal to said means for driving said pen means along the second axis in response to the predominant sound signal, and means connectably driven with said pen means for stopping said power signal at a predetermined position of said pen means along the second axis with respect to the surface of the recording material whereby the power signal is reduced in average duration when the periodic rate of the predominant sound signal is low and increased in average duration when the periodic rate of the predominant sound signal is high.

11. The invention as defined in claim 7 including means responsive to a predominant sound signal of said periodic sounds to energize said pen means and produce a rate mark on said recording material for each cycle of the predominant sound signal.

12. A stethoscopic spectrograph, comprising:
recording material having a surface adapted to be marked;
means for positioning a section of said recording material on a recording platen;
carriage means movable in a lateral direction with respect to the surface of said recording material;
pen means movably mounted to said carriage means and movable in a longitudinal direction with respect to the surface of said recording material, said pen means being energizable to mark the surface of said recording material;
microphone means adapted to pick up generally periodic sounds and convert the same into electrical signals;
first motor means for moving said carriage means laterally with respect to the surface of said recording material in first and second predetermined directions;
means adjustably coupled to said carriage means and responsive to lateral movement thereof in the first predetermined direction, for detecting different frequency components of the electrical signals and energizing said pen means therewith;
second motor means for moving said pen means longitudinally with respect to the surface of the recording material;
means for reversing movement of said carriage means at first and second predetermined limits of travel thereof;
means for de-energizing said second motor means when said first motor means is energized to move said carriage means in the second predetermined direction; and
means for varying movement speed of said pen means in response to the periodic rate of a predominant sound of the periodic sounds picked up by said microphone means, so that said pen means is moved substantially equal distances during respective periods of different periodic rates of the predominant sound of the periodic sounds whereby recordings of uniform size are produced over a wide range of different periodic rates of the predominant sound of the periodic sounds.

13. The invention as defined in claim 12 including means for longitudinally moving said recording material to a new section on said platen when said first motor means is energized to drive said carriage means in the second predetermined direction.

14. The invention as defined in claim 12 in which said pen means includes a plurality of electrically energizable pens which are mounted in spaced relationship on an endless band, and said recording material includes paper having a treated surface for producing visible markings thereon when said pens are energized, said band being driven by said second motor means whereby said pens are moved longitudinally with respect to the surface of said paper.

15. The invention as defined in claim 12 wherein said means for detecting different frequency components of the electrical signals includes a heterodyne oscillator having an output signal which is varied in frequency according to lateral movement of said carriage means, and a modulator for combining the output signal of said oscillator with the electrical signals from said microphone means whereby the combined signals can be adapted to energize said pen means.

16. The invention as defined in claim 12 wherein said means for varying movement speed of said pen means includes filter means for obtaining a predominant sound signal of the periodic sounds, means responsive to the predominant sound signal for applying a power signal to said means for moving said pen means longitudinally, and means connectably driven with said pen means for terminating said power signal at a predetermined longitudinal position of said pen means with respect to the surface of the recording material whereby the power signal is reduced in average duration when the periodic rate of the predominant sound signal is low and increased in average duration when the periodic rate of the predominant sound signal is high.

17. The invention as defined in claim 12 including means responsive to a predominant sound signal of said periodic sounds to energize said pen means and produce rate marks on said recording material for each cycle of the predominant sound signal.

18. A stethoscopic spectrograph, comprising:
recording material having a surface adapted to be marked;
means for positioning a section of said recording material on a recording platen;
carriage means movable in a lateral direction with respect to the surface of said recording material;
pen means movably mounted to said carriage means and movable in a longitudinal direction with respect to the surface of said recording material, said pen means being energizable to mark the surface of said recording material;
microphone means adapted to pick up generally periodic sounds and convert the same into electrical signal;
first motor means for moving said carriage means laterally with respect to the surface of said recording material in first and second predetermined directions between first and second predetermined limits of travel;
means adjustably coupled to said carriage means and responsive to lateral movement thereof in the first predetermined direction, for detecting different frequency components of the electrical signals and energizing said pen means therewith;
second motor means for moving said pen means longitudinally with respect to the surface of said recording material;
an adjustable source of power for energizing said second motor means to drive said pen means at a selected speed corresponding with the periodic rate of a predominant sound of the periodic sounds picked up by said microphone means; and
means for synchronizing energization of said second motor means and movement of said pen means with a predominant sound signal of the periodic sounds whereby said pen means is moved over the section of said recording material in synchronism with appearance of the predominant sound signal of the periodic sounds.

19. The invention as defined in claim 18 including switch means which is actuated when said pen means reaches an end of the section of said recording material to deenergize said second motor means and stop said pen means, said second motor means being energized again on appearance of the predominant sound signal of the periodic sounds.

References Cited by the Examiner
UNITED STATES PATENTS

| | | | |
|---|---|---|---|
| 2,073,457 | 3/37 | Schwarzchild | 179—1 |
| 2,689,161 | 9/54 | Marchand et al. | 346—33 |
| 2,770,517 | 11/56 | Zabriskie | 346—139 X |
| 2,883,642 | 4/59 | Kietz | 346—139 X |
| 2,892,666 | 6/59 | Parker et al. | 346—139 X |
| 3,030,946 | 4/62 | Richards | 128—2.06 |
| 3,048,166 | 8/62 | Rodbard | 346—33 X |
| 3,052,756 | 9/62 | Seven et al. | 179—1 |

LEO SMILOW, *Primary Examiner.*